UNITED STATES PATENT OFFICE.

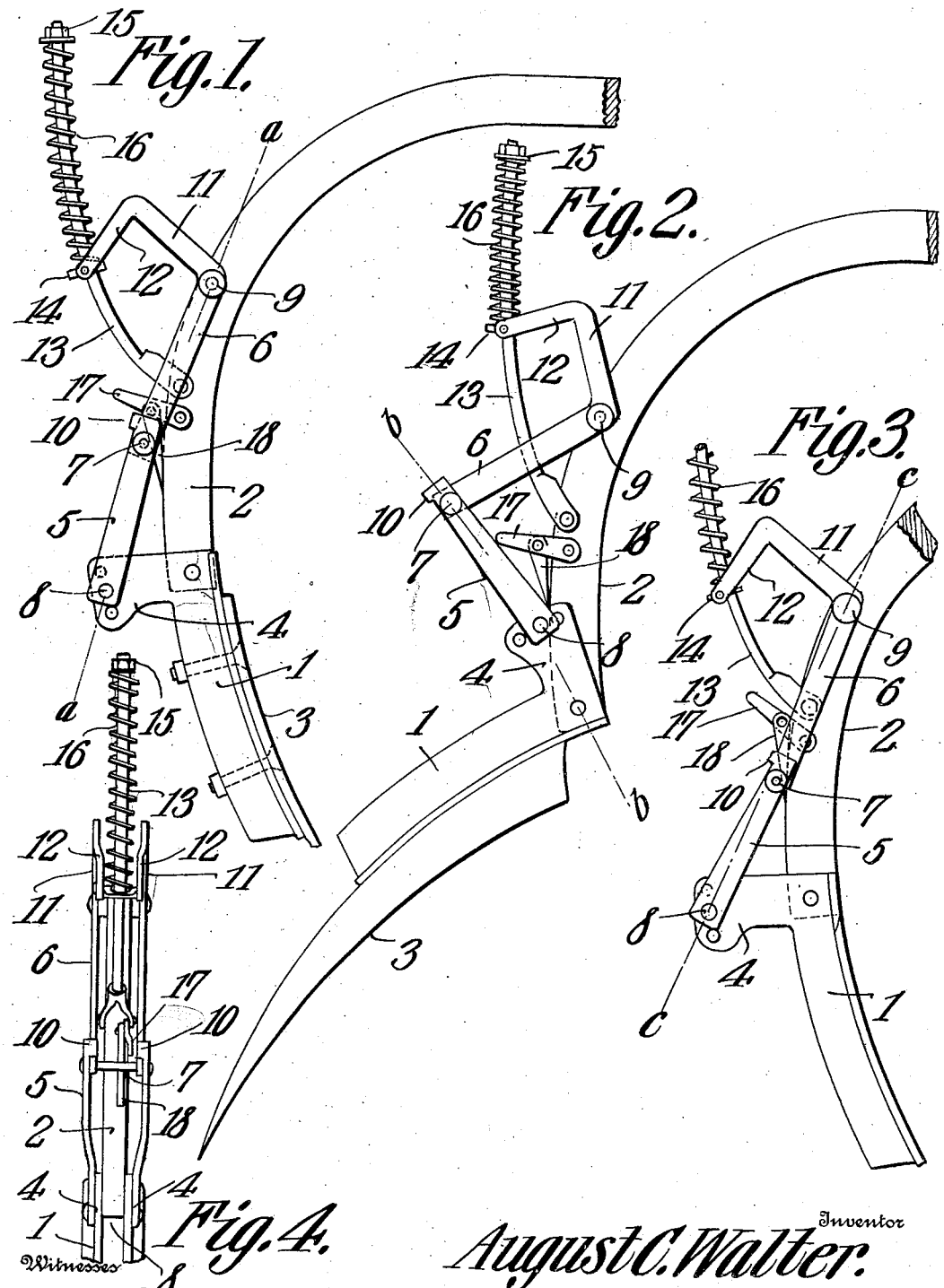

AUGUST CHRISTIAN WALTER, OF ALEX, OKLAHOMA.

SPRING MECHANISM FOR CULTIVATOR-SHOVELS.

No. 894,247.  Specification of Letters Patent.  Patented July 28, 1908.

Application filed February 28, 1908. Serial No. 418,346.

*To all whom it may concern:*

Be it known that I, AUGUST C. WALTER, a citizen of the United States, residing at Alex, in the county of Grady and State of Oklahoma, have invented a new and useful Spring Mechanism for Cultivator-Shovels, of which the following is a specification.

This invention has relation to spring mechanism for cultivator shovels and it consists in the novel construction and arrangement of its parts as hereinafter shown and described.

The object of the invention is to provide a spring mechanism of the character indicated which is adapted to operate automatically for permitting the shovel to swing rearwardly when it encounters an obstruction and which is adapted to normally hold the shovel in a predetermined relation to the standard upon which it is mounted and when passing through the soil. The parts of the mechanism, however, may be so adjusted that the shovel becomes positively fixed with relation to the standard and cannot be swung rearwardly as a result of any amount of stress to which it may be subjected. The parts of the mechanism are so arranged that the shovel may be swung rearwardly and automatically held in such position by mutual interlocking of the parts.

In the accompanying drawing: Figure 1 is a side elevation showing the normal positions of the parts of the mechanism when the shovel is in work facing position with relation to the standard. Fig. 2 is a side elevation of the parts showing their relative position when the shovel is swung back and locked in such position with relation to the standard. Fig. 3 is a side elevation of the mechanism showing the parts thereof so adjusted that the shovel is held in fixed work facing position with relation to the standard; and Fig. 4 is an edge elevation of the mechanism.

The shovel bracket 1 is pivotally attached to the lower end of the standard 2. The shovel 3 is mounted upon the said bracket in the usual manner. The bracket 1 is provided with the rearwardly disposed arms 4 which lie upon the opposite sides of the standard 2. The toggle levers 5 and 6 are pivotally connected together by a cross pin 7 and the lower ends of the levers 5 are pivoted to the arms 4 by means of the cross pin 8. The pins 7 and 8 extend transversely across the rear edge of the standard 2. The levers 6 are pivoted at their upper portions to the standard 2 at points 9. The upper ends of the levers 5 are provided at their rear edges with lugs 10 which at times are adapted to engage the rear edges of the levers 6. The upper portions of the levers 6 are extended upwardly and rearwardly as at 11 and downwardly and rearwardly as at 12. The guide rod 13 is pivotally connected at its lower end with the standard 2 and is substantially arcuate longitudinally. Said rod passes through the eye 14 which is pivotally mounted between the rear ends of the portions 12 of the toggle levers 6. The upper end of the rod 13 is screw threaded and the adjusting nut 15 is mounted thereon. The coil spring 16 surrounds the upper portion of the rod 13 and is interposed between the nut 15 and eye 14 and is under thrust tension. The tension of the said spring may be augmented or diminished by adjusting the nut 15 longitudinally along the rod 13. The lever 17 is fulcrumed to the standard 2 and the wedge 18 is pivotally connected with said lever and lies against the rear edge of the standard 2. The said wedge is in the path of movements of the cross pins 7 and 8 and there is sufficient friction between the lever 17 and the standard 2 at the fulcrum point of the said lever to hold the said lever and the wedge 18 in an adjusted position.

When it is desired that the shovel bracket 1 shall have a rearward swinging movement when the shovel 3 is subjected to excessive strain the parts are arranged substantially as illustrated in Fig. 1, that is to say, the lever 17 is swung so that the wedge 18 is interposed between the rear edge of the standard 2 and the cross pin 7 to such an extent as to hold the cross pin 7 to the rear of the line $a$, $a$, which passes through the centers of the pin 8 and pivot 9. Thus the toggle levers 5 and 6 are held out of longitudinal alinement with each other and the angularity of this relation may be adjusted in proportion to the extent to which the wedge 18 is projected between the standard 2 and pin 7. Thus, the normal disposition of the shovel 3 with relation to the standard 2 may be effected to a nicety. When the shovel 3 meets an obstruction or is subjected to undue strain the bracket 1 swings rearwardly upon its pivot and the arms 4 describe an arc in an upward direction, this movement forces the pin 7 rearwardly and the angle between the toggle levers 5 and 6 is diminished. At the same time the portions 12 of the levers 6 describe an arc about the pivot 9 as a center and the eye 14 is carried up along the rod 13 and compresses the spring 16 and increases the tension thereof. The rod 13 swings upon its pivotal connection with the standard 2 in order that it may follow the movement of the eye 14 while the eye 14 swings upon its pivotal connections with the portions 12 in order that it may remain in parallel relation, or nearly so, with the nut 15 during the movement just above described. When the shovel 3 passes over the obstruction or moves beyond the point at which it is subjected to excessive strain the tension of the spring 16 comes into play and reverses the movements of the parts above described and forces the shovel into its predetermined normal position with relation to the standard 2.

If at any time it should be desired to swing the shovel 3 back and hold the same in such position temporarily the bracket 1 is swung upon its pivot until the cross pin 8 comes in contact with the wedge 18 when the said pin 8 will be located at a point in advance of the line $b$, $b$, shown in Fig. 2 and which passes through the centers of pivot of the bracket 1 and the cross pin 7. Thus, the tension of the spring 16 operating through the intervening parts will have a tendency to hold the pin 8 against the wedge 18 and the shovel 3 is temporarily held in a rearwardly disposed fixed position with relation to the standard 2. This manipulation of the shovel is desirable in implements employing two or more shovels where it is advantageous to have one or more of the shovels out of operation in the soil while other shovels are operating in the soil.

When it is desired that the shovel bracket 1 shall be held in a fixed position with relation to the standard 2 so that the said shovel bracket and shovel will be held in rigid soil engaging position; the lever 17 is swung so that the wedge 18 is partially or entirely removed from between the cross pin 7 and the rear edge of the standard 2, thus the said cross pin 7 may move to a position, as shown in Fig. 3, which is in advance of the line $c$, $c$ drawn through the centers of the cross pin 8 and the pivot 9. When in this position the toggle levers 5 and 6 are disposed at an angle to each other but opposite to that as illustrated in Fig. 1, and consequently, the tension of the spring 16 will have a tendency through the toggle lever 6 to hold the pin 7 in advance of the line $c$, $c$ and the lugs 10 upon the levers 5 will bear against the edges of the levers 6 and the levers 5 are converted into braces which rigidly hold the shovel bracket 10 with relation to the standard 2. Thus, it will be seen that means is provided for rigidly locking the shovel in fixed work facing position with relation to the standard.

Having described my invention, what I claim as new and desire to secure by Letters Patent is:—

In combination with a standard having a shovel pivotally connected therewith, toggle levers pivotally connected together and with the standard and shovel respectively, a lever fulcrumed upon the standard, a wedge pivoted to said lever and engaging the edge of the standard and lying in the path of the pivotal connection between the toggle levers.

In testimony that I claim the foregoing as my own, I have hereto affixed my signature in the presence of two witnesses.

AUGUST CHRISTIAN WALTER.

Witnesses:
W. G. JAHN,
RICHARD RUDESILL.